US011046351B2

(12) United States Patent
Davies (10) Patent No.: US 11,046,351 B2
(45) Date of Patent: Jun. 29, 2021

(54) STEERING COLUMN ASSEMBLY

(71) Applicant: TRW Limited, Solihull (GB)

(72) Inventor: Niclas Davies, Birmingham (GB)

(73) Assignee: ZF Automotive UK Limited

( * ) Notice: Subject to any disclaimer, the term of this patent is extended or adjusted under 35 U.S.C. 154(b) by 148 days.

(21) Appl. No.: 16/337,480

(22) PCT Filed: Sep. 27, 2017

(86) PCT No.: PCT/GB2017/052894
§ 371 (c)(1),
(2) Date: Mar. 28, 2019

(87) PCT Pub. No.: WO2018/060703
PCT Pub. Date: Apr. 5, 2018

(65) Prior Publication Data
US 2019/0232996 A1    Aug. 1, 2019

(30) Foreign Application Priority Data
Sep. 28, 2016  (GB) ..................................... 1616480

(51) Int. Cl.
*B62D 1/184* (2006.01)
*B62D 1/185* (2006.01)

(52) U.S. Cl.
CPC ............. *B62D 1/184* (2013.01); *B62D 1/185* (2013.01)

(58) Field of Classification Search
CPC .......... B62D 1/18; B62D 1/184; B62D 1/185; B62D 1/187; B62D 1/192
See application file for complete search history.

(56) References Cited

U.S. PATENT DOCUMENTS

| 4,396,207 A | * | 8/1983 | Okamoto | ............... | B62D 1/183 |
| | | | | | 180/78 |
| 5,009,120 A | * | 4/1991 | Iseler | ..................... | B62D 1/184 |
| | | | | | 280/775 |

(Continued)

FOREIGN PATENT DOCUMENTS

| EP | 2749475 A1 | 7/2014 |
| EP | 3067250 A1 | 9/2016 |

(Continued)

OTHER PUBLICATIONS

PCT International Search Report and Written Opinion, Application No. PCT/GB2017/052894, dated Jan. 3, 2018.

*Primary Examiner* — Frank B Vanaman
(74) *Attorney, Agent, or Firm* — Robert James Harwood (57) ABSTRACT

A steering column assembly is disclosed comprising a telescopic shroud having an outer shroud portion and an inner shroud portion with an end that extends into the outer shroud portion. A plate is fixed to the inner shroud portion and includes a slot that extends axially along the inner shroud portion. A block is releasably interlockable with the plate to prevent telescopic motion of the inner shroud portion relative to the outer shroud portion. The steering column assembly includes a clamp assembly operable between a clamped condition in which the outer shroud portion clamps around the inner shroud portion and an unclamped condition in which the outer shroud portion is unclamped from the inner shroud portion. Four bearing surfaces are arranged in two facing pairs, one bearing surface of each facing pair being associated with the inner shroud portion and the other bearing surface of each facing pair being associated with the outer shroud portion, at least one adjustable bearing element including a respective one of said bearing surfaces. The adjustable bearing element is adjustable relative to one of the inner shroud portion or outer (Continued)

shroud portion for setting the amount rotational free play between the inner shroud portion and outer shroud portion when the assembly is in an unclamped condition.

16 Claims, 5 Drawing Sheets

(56) References Cited

U.S. PATENT DOCUMENTS

| | | | | |
|---|---|---|---|---|
| 5,199,319 | A * | 4/1993 | Fujiu | B62D 1/184 280/775 |
| 5,607,184 | A * | 3/1997 | Barton | B62D 1/184 280/775 |
| 2003/0172765 | A1 * | 9/2003 | Heiml | B62D 1/184 74/493 |
| 2010/0219624 | A1 * | 9/2010 | Matsuno | B62D 1/184 280/779 |

FOREIGN PATENT DOCUMENTS

| | | |
|---|---|---|
| EP | 3121094 A1 | 1/2017 |
| EP | 3162656 A1 | 5/2017 |
| WO | 2012027762 A1 | 3/2012 |
| WO | 2015190301 A1 | 12/2015 |
| WO | 2016035515 A1 | 3/2016 |

* cited by examiner

STEERING COLUMN ASSEMBLY

CROSS-REFERENCE TO RELATED APPLICATIONS

This application is a national stage of International Application No. PCT/GB2017/052894, filed 27 Sep. 2017, the disclosures of which are incorporated herein by reference in entirety, and which claimed priority to Great Britain Patent Application No. 1616480.8, filed 28 Sep. 2016, the disclosures of which are incorporated herein by reference in entirety.

BACKGROUND TO THE INVENTION

This invention relates to improvement in steering column assemblies. More particularly, the invention relates to steering column assemblies including a positive locking system provided by the interaction between a block and a clamp rail.

It is known to provide a collapsible steering column assembly comprising a steering shaft that is supported within a steering column shroud. To prevent significant injury to the driver in the event of a crash the steering column should be able to collapse as an axial load is applied through the steering wheel, for instance in a front impact where an unrestrained driver is thrown onto the steering wheel.

A typical collapsible steering column assembly comprises a telescopic shroud, having an outer shroud portion and an inner shroud portion, an end of the inner shroud portion extending into the outer shroud portion. The outer shroud portion may be located closer to the steering wheel, or further from the steering wheel than the inner shroud portion. A telescopic steering shaft, also having an upper and lower shaft part, is supported inside the shroud through one or more bearing assemblies. The steering wheel is fixed to the upper shaft portion.

The part of the shroud closest to the wheel must be able to move, or collapse, during a crash so as to allow the steering wheel to move forwards relative to the vehicle body but be prevented from moving during normal use. There is also a need to fix the shroud relative to the vehicle body to define the rake position of the steering wheel. This is typically achieved by a clamp mechanism that secures the shroud to a support bracket that is in turn fixed to the vehicle body, perhaps to a cross beam provided behind the dashboard of the vehicle. The clamp mechanism may be adjustable to permit reach adjustment, or rake adjustment, or both, of the steering wheel. In the event of a crash the shroud must be able to move, and this is achieved if it is able to break free of the clamp mechanism, or for the support bracket to be able to break free of the vehicle body, to allow the steering column assembly to collapse telescopically.

A lever may be provided on an end of the a clamp bolt that forms a part of the clamp mechanism that the driver can push or pull to rotate the clamp bolt and thereby operate the clamp mechanism.

Steering column assemblies are known which include a clamp mechanism that relies solely on friction when locked to prevent unwanted movement of the column assembly. The clamp mechanism can be unlocked and locked by movement of a locking lever or, sometimes, electrically using a motor or perhaps hydraulically or pneumatically. These columns can typically resist radial and/or axial forces of 600N applied at the steering wheel before slipping.

However, it is increasingly a requirement from car manufacturers that there should be no substantial movement of the steering column assembly when very high forces are applied and no or little rotation of the shroud during adjustment.

SUMMARY OF THE INVENTION

In accordance with a first aspect of the invention, there is provided a steering column assembly comprising:
a telescopic shroud having an outer shroud portion and an inner shroud portion, an end of the inner shroud portion extending into the outer shroud portion;
a plate fixed to the inner shroud portion including a slot that extends axially along the inner shroud portion;
a block that is releasably interlockable with the plate to prevent telescopic motion of the inner shroud portion relative to the outer shroud portion;
and a clamp assembly operable between a clamped condition in which the outer shroud portion clamps around the inner shroud portion and an unclamped condition in which the outer shroud portion is unclamped from the inner shroud portion,
characterised in that the assembly further comprises four bearing surfaces arranged in two pairs facing, one bearing surface of each facing pair being associated with the inner shroud portion and the other bearing surface of each pair being associated with the outer shroud portion, at least one adjustable bearing element including a respective one of said bearing surfaces, the adjustable bearing element being adjustable relative to one of the inner shroud portion or outer shroud portion for setting the amount rotational free play between the inner shroud portion and outer shroud portion when the assembly is in an unclamped condition.

This arrangement ensures that free play is limited to a precise required level in the unclamped position by providing an adjustable arrangement of bearing surfaces. Note that in the clamped condition the two bearing faces of each pair contact each other but are spaced apart when the assembly is unclamped. In particular excess rotational free play may be removed, which may avoid undue rotation of the inner shroud portion relative to the outer shroud portion during adjustment of the column assembly by the driver.

The main benefit of the arrangement, as found by the applicant, is the ability to precisely set the inner diameter of the outer shroud when in the clamped position, removing any tolerances so that when moving to the unclamped position the only movement is that determined by the movement of the outer shroud.

Each pair may include two diametrically-opposed bearing surfaces. This ensures that the force between the bearing surfaces is normal to each surface.

The adjustable bearing element may include a first end and a second end, the first end forming one of the bearing surfaces. The second end may be operable for adjustment of the adjustable bearing element. The element may also have a head to facilitate installation by automated bowl feeding.

The adjustable bearing element may be mounted at least partially within an aperture in the outer shroud portion.

The adjustable bearing element may include a screw thread which is engageable with a corresponding screw thread in the aperture.

The adjustable bearing element, within the aperture, may be accessible for adjustment.

One bearing surface of each pair may be associated with the outer shroud portion and the other bearing surface of each pair may be associated with the inner shroud portion.

One of the outer shroud bearing surfaces may be formed on a non-adjustable bearing element. Providing the bearing elements means that the wear can be further controlled.

The non-adjustable bearing element may be a pin. The pin may include a pin head which forms one of the bearing surfaces.

The plate may include two lateral faces which form respective bearing surfaces.

The clamp assembly when clamped may reduce the internal diameter of the outer shroud portion to clamp the outer shroud portion onto the inner shroud portion when in the clamped condition.

A slot may be provided in the outer shroud portion which is at least partially closed in the clamped condition and opens further in the unclamped condition. The two pairs of bearing surfaces may be located within the slot. The plate may also be located within the slot. The slot allows the inner diameter of the outer shroud to be reduced when clamped, by closing of the slot, which in turn brings the bearing faces into contact. When they are in contact no further reduction in the width of the slot may be possible. The adjustable bearing element allows the clamping to be fine-tuned.

One of the bearing surfaces of each pair may be located in a side wall of the slot in the outer shroud portion.

The other bearing surface of each pair may be carried by a side wall of the plate. It may comprise a portion of the plate side wall.

The steering column assembly may include a clamp bolt which is rotatable by way of a lever in order to move the block into and out of engagement with the clamp rail.

In accordance with a second aspect of the invention there is provided a method of assembling a steering column assembly so as to set rotational free play, the steering column assembly comprising:

an inner shroud portion and an outer shroud portion, an end of the inner shroud portion extending into the outer shroud portion, a plate fixed to the inner shroud portion including a slot that extends axially along the inner shroud portion, a block that is releasably interlockable with the plate to prevent telescopic motion of the inner shroud portion relative to the outer shroud portion, four bearing surfaces arranged in two facing pairs, one bearing surface of each pair being associated with the inner shroud portion and the other bearing surface of each pair being associated with the outer shroud portion, and an adjustable bearing element including one of said bearing surfaces, the method comprising:

positioning the inner shroud portion within the outer shroud portion such that one of the contacting pairs of bearing surfaces are in contact;

adjusting the adjustable bearing element to ensure both contacting pairs of bearing surfaces are in contact.

Prior to adjusting the adjustable bearing element, a force may be applied to the outer shroud portion to move the shroud to the clamped position. The force may be a constant force or a ramped force.

The gradient of the ramped force may be detected to determine the clearance reduction between the inner shroud portion and outer shroud portion.

The adjustable bearing element may be fixed in position once adjusted to prevent unwanted movement.

Other advantages of this invention will become apparent to those skilled in the art from the following detailed description of the preferred embodiments, when read in light of the accompanying drawings.

DETAILED DESCRIPTION OF THE INVENTION

Figure 1:
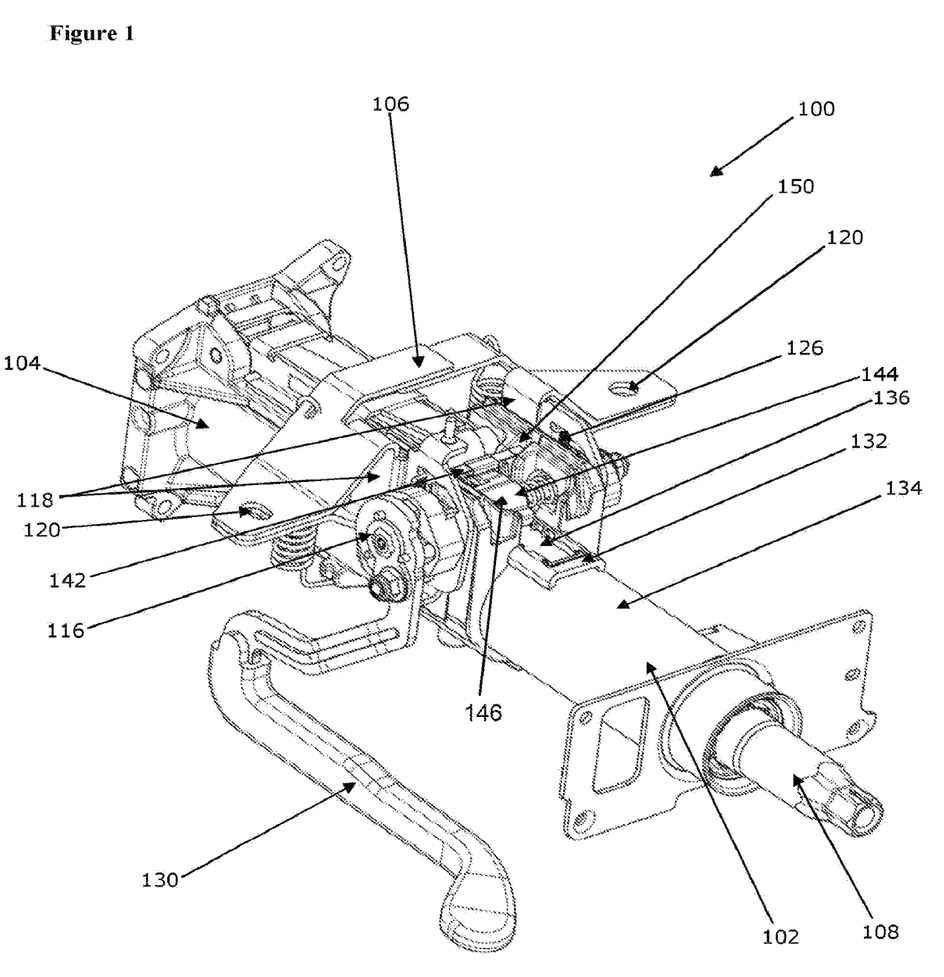
FIG. 1 depicts an isometric view of a steering column assembly in accordance with the first aspect of the invention.
Figure 2:
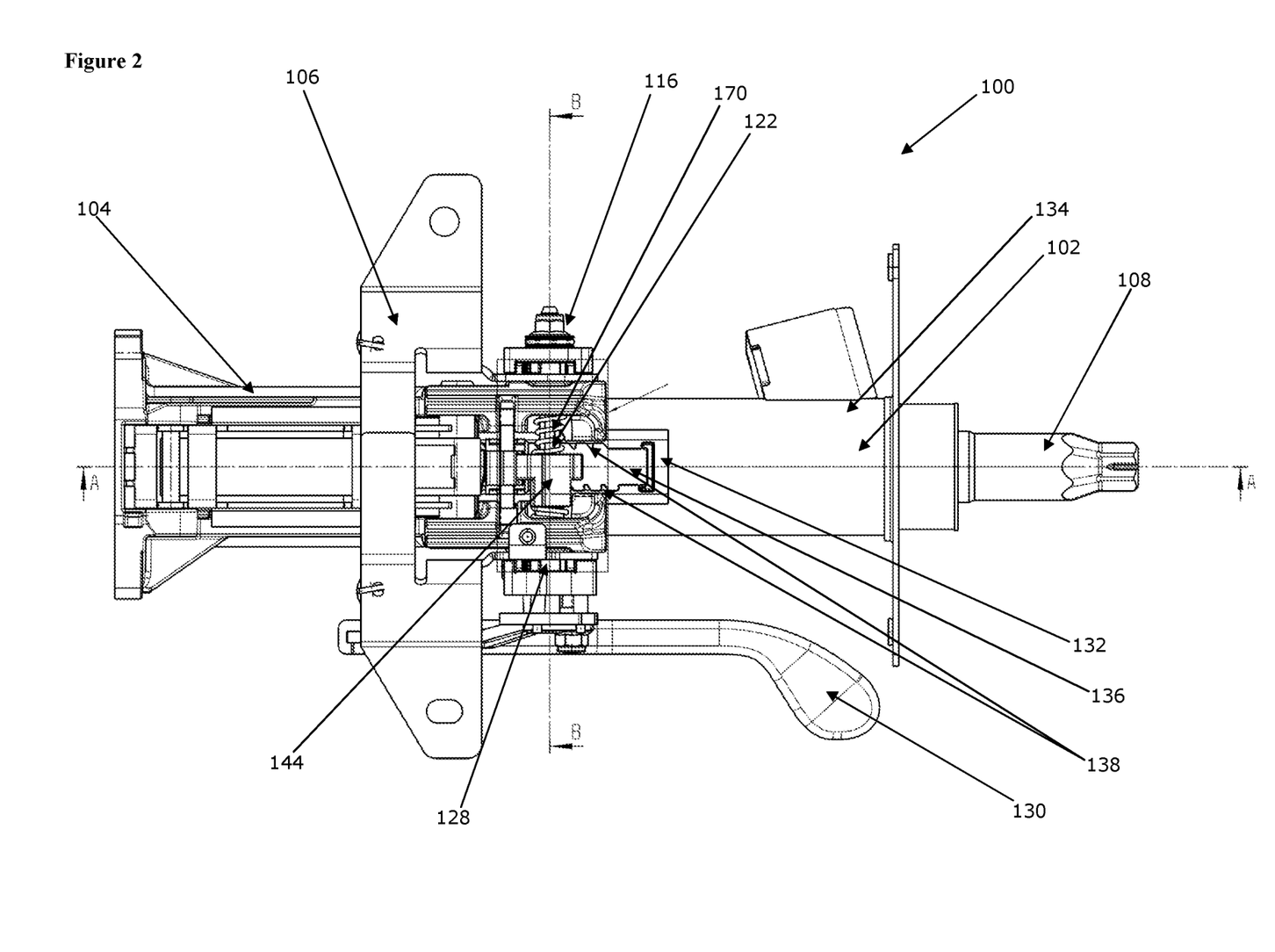
FIG. 2 shows a plan view of the steering column assembly of FIG. 1.
Figure 3:
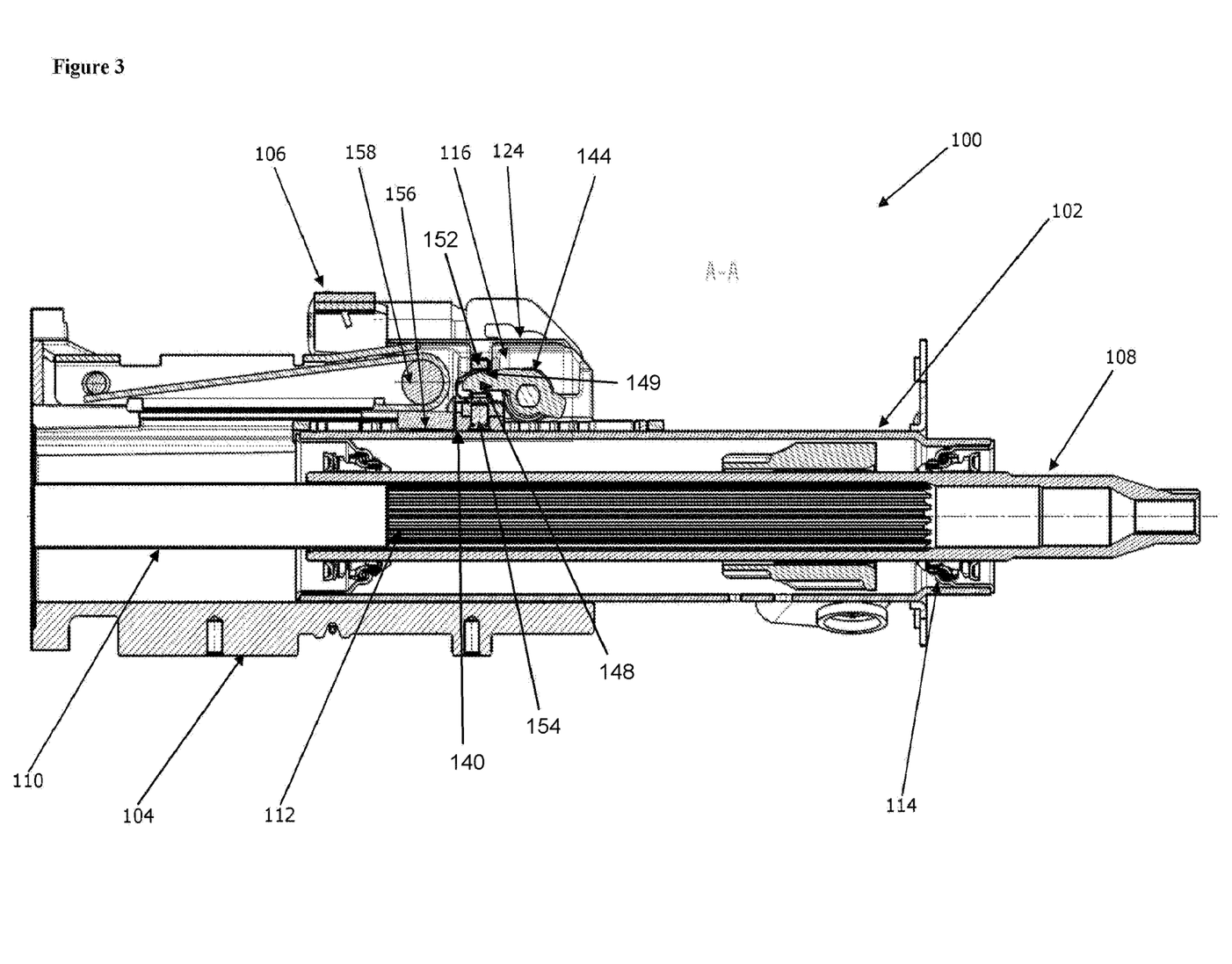
FIG. 3 is a cross-sectional representation of the steering column assembly of FIG. 2 along the line A-A.

Referring first to FIGS. 1 to 3, a steering column assembly 100 is shown, in accordance with the first aspect of the invention. The steering column assembly 100 comprise a shroud having and inner shroud portion 102 and an outer shroud portion 104, each of which comprises a substantially cylindrical tube. The shroud 102, 104 extends from a gearbox housing (not shown) that is fixed at a pivot point to a part of the vehicle body and also releasably fixed to a support bracket 106 which is secured to the vehicle, typically by bolting it to a region under the dashboard at a point somewhere between the pivot and the steering wheel.

The shroud portions 102, 104 are moveable relative to each other with the end of the inner shroud portion 102 being a sliding fit within an end of the outer shroud portion 104. The shroud 102, 104 surrounds a telescopic steering column shaft 108, 110. The shaft 108, 110 includes an upper shaft portion 108 that at least partially surrounds a lower shaft portion 110, although this can be reversed, the two portions being connected through complimentary axially extending splines 112. The opposite end of the upper shaft portion 108 is tapered so that it can be secured to a steering wheel (not shown). The lower shaft portion 110 is connected to the gearbox housing (not shown), which in turn connects to the road wheels of the vehicle. The skilled person will understand that the invention also applies to so-called inverted assemblies in which the moving shroud part will slide over the fixed part rather than within it.

As depicted, the upper shaft portion 108 fits over the lower shaft portion 110 and can move axially whilst the lower shaft portion 110 is fixed in an axial direction. Similarly, the inner shroud portion 102 is located towards the steering wheel and slides within the outer shroud portion 104, which is also fixed in an axial direction. An upper column bearing assembly 114 is located between the upper shaft portion and the outer shroud portion. This fills the space and ensures that the shaft 108, 110 is located securely within the shroud 102, 104.

The shroud portions 102, 104 are fixed to the bracket 106 by a clamp mechanism 116. The clamp mechanism 116 can be unlocked and locked to allow the rake of the steering column shroud 102, 104 to be adjusted by pivoting about the pivot point. When locked the steering column shroud 102, 104 cannot easily be moved.

The bracket 106 includes two arms 118 which extend generally downwards in a vertical plane and extend down either side of the shroud 102, 104. The bracket 106 is securable to the vehicle body using bolts (not shown) that pass through openings 120 in the bracket 106.

The clamp mechanism 116 comprises a clamp bolt 122 or pin which passes through a respective generally vertical slot 124 in each arm 118. The shape of the vertical slots 124 permits rake adjustment of the steering column shroud 102, 104. The slots 124 include a vertical rack 126 with a plurality of teeth. Respective cams 128 mounted on the clamp bolt 122 releasably engage with the teeth of the vertical rack 126 upon rotation of the clamp bolt 122. A lever 130 mounted adjacent to one end of the clamp bolt 122 enables this rotation. Thus, the rake of the steering column assembly 100 can be adjusted.

The clamp bolt carries a cam mechanism which varies in length between a clamped and an unclamped condition of the clamp assembly, with the length being greater when clamped. This causes the two arms of the bracket to be squeezed together, in turn crushing the outer shroud onto the inner shroud to clamp them together. A slot is provided in the top of the outer shroud which can open and close as the assembly is unclamped or clamped.

In order to positively control the reach position of the assembly, a plate or rail 132 is provided which in the depicted embodiment is affixed to an outer surface 134 of the inner shroud portion 102. The plate 132 includes a slot 136 with two opposing and parallel rows of teeth 138, extending in an axial direction along the inner shroud portion 102. The plate fits within the slot provided in the outer shroud portion 104, and is narrower than the slot is wide so there is a clearance on each side.

Releasably engageable with the plate 132 is a toothed block 140. The toothed block 140 includes a row of teeth on each of its sides which are complementarily-shaped so as to allow engagement with the teeth of the horizontal rack 132. The toothed block 140 itself is held in a fixed position relative to the outer shroud portion 104 by a carrier element 142. Thus, with the toothed block 140 in a clamped condition, the teeth provide positive locking of the toothed block 140, and thus the support bracket 106, relative to the plate 132 which prevents the inner shroud portion 102 moving in an axial direction.

The releasable engagement of the toothed block 140 is controlled by a rocker 144 which is attached to the clamp bolt 122 and positioned, in use, between the two arms 118 of the support bracket 106.

Although the locking mechanism is described with reference to a toothed block and rows of teeth on the plate, it may be possible to positively lock the two elements without the provision of teeth.

The rocker 144 includes a main body 146 which is located about the clamp bolt 122 and a lever arm 148 which extends towards and is received within an opening 149 in the carrier element 142. The carrier element 142 is held in the outer shroud 104 within guides 150 which allow movement only in a vertical and perpendicular direction relative to the shroud 102, 104. As such, upon rotation of the rocker 144 in a first direction, the lever arm 148 presses against an upper portion 152 of the carrier element 142, causing the movement of the carrier element 142 away from the plate 132 and drawing the toothed block 140 out of engagement. Upon rotation of the rocker 144 in a second direction opposite to the first direction, the carrier element 142 is lowered and the toothed block 140 is engaged with the horizontal rack 132.

The toothed block 140 is separable from the carrier element 142 in the event of a large force being exerted on the toothed block 140, for example in the event of a crash in which the driver of the vehicle impacts the steering wheel. The toothed block 140 is connected to the carrier element 142 by way of a frangible pin 154. The frangible pin 154 is configured to break upon the application of a predetermined force, which can thus be configured to be the force likely to be endured in a crash situation. The breaking of the frangible pin 154 allows the inner shroud portion 102, with horizontal rack 132 and toothed block 140 attached, to collapse, whilst the clamp mechanism 116 and carrier element 142 stay in position relative to the support bracket 106.

During collapse, the toothed block 140 will impact upon, and move a puller 156. The puller 156 comprises a plate or block with a strip of material, usually metal, attached to it which is deformed around an anvil 158 upon movement of the toothed block 140. As such, the collapse of the steering column assembly 100 is controlled.

Figure 4:
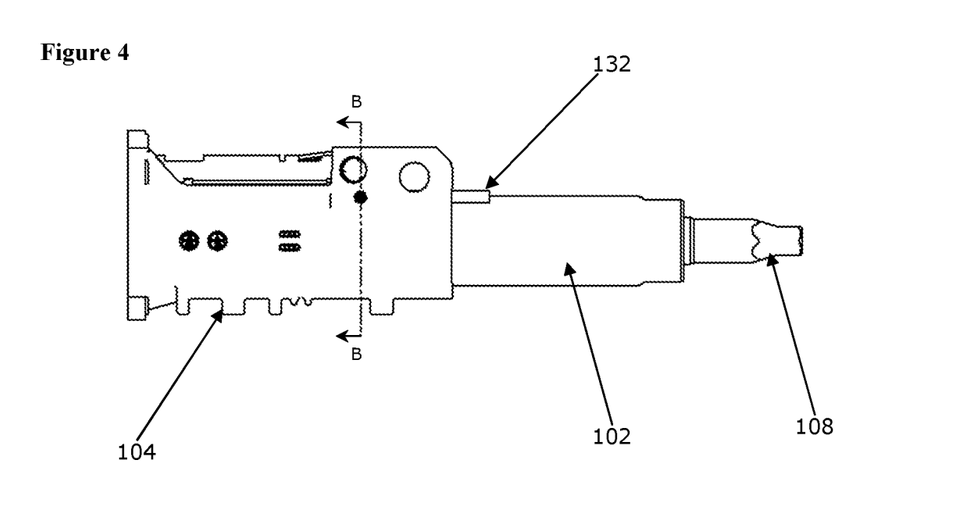
FIG. 4 is a lateral view of the inner shroud portion and outer shroud portion of FIG. 1, also including the steering shaft.
Figure 5:
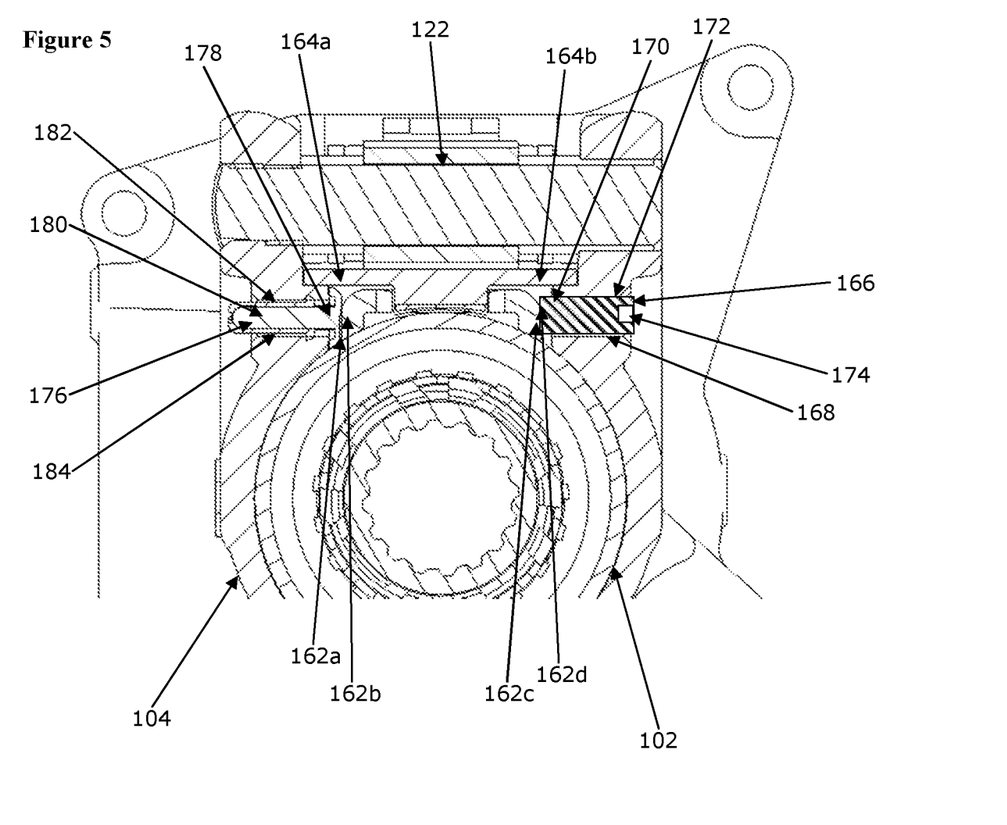
FIG. 5 is a cross-sectional representation of the steering column assembly of FIG. 4 along the line B-B.

FIG. 4 shows the inner shroud portion 102 and outer shroud portion 104, along with the upper shaft portion 108, with some of the other components omitted for clarity. FIG. 5 is a cross-section of FIG. 4 through line A-A. This cross-sectional view shows how free play is reduced in the unclamped condition in the present embodiment of the invention.

The cross-sectional view shows four bearing surfaces 162a, 162b, 162c, 162d, arranged in two pairs 164a, 164b, which, in use, prevent rotation of the inner shroud portion 102 relative to the outer shroud portion 104. Two of the bearing surfaces 162b, 162c are formed by the lateral sides of the plate 132 of the inner shroud portion 102, whilst the other two bearing surfaces 162a, 162d, which contact the bearing surfaces 162b, 162c of the plate 132, are formed by components associated with the outer shroud portion 104. In order that the arrangement can adjust for inaccuracies in the component parts, adjustability of the bearing mechanism is provided by an adjustable bearing element 166.

Note that the bearing surfaces 162a-162d are located at the slot in the outer shroud portion, and provided the points of contact between the outer shroud portion and inner shroud portion when clamped.

Figure 7:
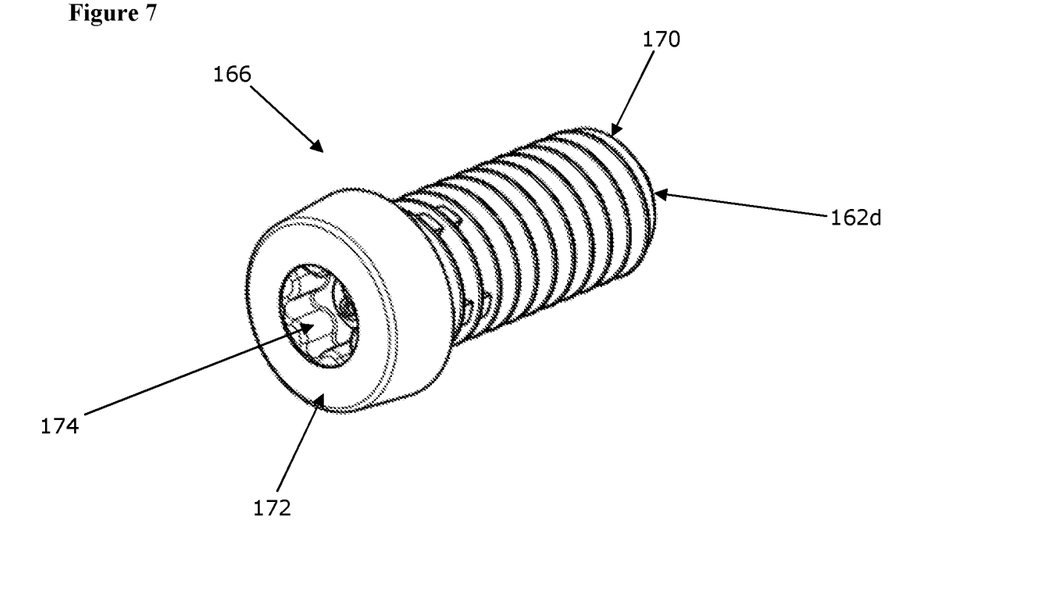
FIG. 7 is a perspective view of the adjustable bearing element of FIG. 5, in isolation.

The adjustable bearing element 166, shown in FIG. 7 and which in the present embodiment takes the form of a screw, is located within a first aperture 168 in the outer shroud portion 104 in a side wall of the slot in the outer shroud portion 102. The adjustable bearing element 166 includes a first end 170 and a second end 172, the first end 170 of the adjustable bearing element 166 forming one of the bearing surfaces 162d. The second end 172 of the adjustable bearing element 166 includes a socket 174 for the receipt of an adjusting tool. The socket 174 allows the adjustable bearing element 166 to be rotated in order to alter the longitudinal position of the adjustable bearing element 166 within the first aperture 168. In order that the longitudinal position is alterable, the first aperture 168 and adjustable bearing element 166 of the present embodiment include complementary screw threads.

In an alternative embodiment, the second end 172 of the adjustable bearing element 166 could be configured to be manually-manipulated or could include a shaped head for the receipt of a spanner, for example. Furthermore, the complimentary screw threads may be replaced with another method of altering the longitudinal position of the adjustable bearing element 166. Such methods may include providing the adjustable bearing element 166 and first aperture 168 with an interference fit such that friction maintains their relative positions. Other possibilities for the adjustment of the adjustable bearing element 166 and the maintenance of its position will be apparent to the skilled person.

Figure 6:
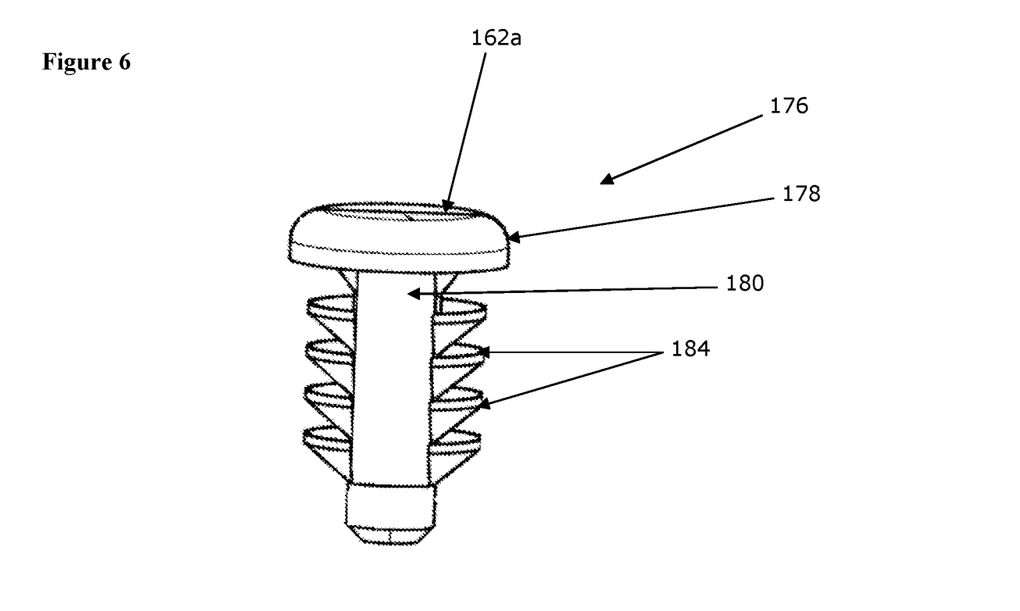
FIG. 6 is a perspective view of the non-adjustable bearing element of FIG. 5, in isolation.

Diametrically opposing the adjustable bearing element 166 in the outer shroud portion 104 is a non-adjustable bearing element 176 in the form of a pin, shown in FIG. 6, which forms a further one of the bearing surfaces 162a. The non-adjustable bearing element 176 includes a head 178 on which the bearing surface 162a is formed and a tail 180 which is received within a second aperture 182 within the outer shroud portion 104. In order that the non-adjustable bearing element 176 is held snugly within the outer shroud portion 104, a series of anchors 184 are formed on the non-adjustable bearing element 176. The anchors 184 are resiliently deformable to ensure a tight fit and hold the non-adjustable bearing element 176 in place.

The adjustable bearing element 166 and non-adjustable bearing element 176 may be formed of plastic to ensure low friction, as telescoping of the shroud is likely to result in rubbing of the bearing surfaces 162a, 162b, 162c, 162d which could cause wear. The bearing elements 166, 176, or just the bearing surfaces 162a, 162b, 162c, 162d themselves, could be formed such that each pair 164a, 164b of contacting surfaces has a low coefficient of friction.

During assembly, the adjustable bearing element 166 will be adjusted to ensure that free play is reduced or removed to only the deflection of the outer shroud during the adjustment process. One method of setting the position of the bearing surfaces to minimise the free play will therefore be described, although other methods will also be achievable.

Firstly, the inner shroud portion 102 will be rotated such that a bearing surface 162b of the inner shroud portion 102, in this case formed on the horizontal rack 132, abuts the non-adjustable bearing element 176. Once this is achieved, the adjustable bearing element 166 may be adjusted such that it is in contact with the other bearing surface 162c of the inner shroud portion 102. With both pairs 164a, 164b of contacting surfaces in contact, free play will be removed, minimising the possible rotation of the inner shroud portion 102 relative to the outer shroud portion 104.

It may be desired to ensure that there is not an undue level of friction between the inner shroud portion 102 and outer shroud portion 104. If this is the case, the adjustable bearing element 166 may be further adjusted such that the force between it and its opposing bearing surface 162c is minimal, reducing friction. Alternatively, it is possible that, during initial adjustment, it is ensured that the adjustable bearing element 166 is not made to bear tightly against the bearing surface 162c of the horizontal rack 132.

It may also be necessary to simulate the loading of the clamp mechanism 116 on the steering column assembly 100 before making the necessary adjustments to the adjustable bearing element 166. One method of doing so is to apply a constant, controlled force to the outer shroud portion 104, prior to adjustment of the adjustable bearing element 166. This constant force can be, for example, 2 kN applied to the outer shroud portion 104 at the points at which the clamp bolt 122 will pass through. By compressing the outer shroud portion 104 as if the steering column assembly 100 were in the clamped condition, the adjustment of the adjustable bearing element 166 will more effectively reduce free play when the steering column assembly 100 is fully assembled and in use.

Another option for the application of force is to apply an increasing force and detect the gradient of the force application as it is applied. Thus, when a high force gradient is detected, it is clear that the free play between the cylindrical portions of the outer shroud portion 104 and the inner shroud portion 102 has been removed. At this point, the adjustable bearing element 166 can be moved to remove free play between the bearing surfaces 162a, 162b, 162c, 162d.

It is foreseeable that it may be desirable to adjust the steering column assembly 100 once during the manufacture and assembly processes. Therefore, whilst the adjustable bearing element 166 must be adjustable during the assembly process, it may then be fixed in position by welding, adhesives, special thread features, or other suitable fixing means, if required.

Although the bearing surfaces 162b, 162c of the inner shroud portion 102 have been described as being formed on the horizontal rack 132, it is possible to form them on another part of the inner shroud portion 102 such as the main cylindrical section. Alternatively, additional inner shroud bearing elements may be provided which are specifically provided to act as the bearing surfaces. For example, additional rails may be provided adjacent and parallel to the horizontal rack, and in communication with the inner shroud portion, to avoid subjecting the horizontal rack itself to excessive forces or wear. The non-adjustable bearing element and adjustable bearing element may then contact the additional rails instead of the horizontal rack. Similarly, the non-adjustable bearing element may be omitted, to simplify the arrangement, if desired.

It may also be desirable to include the adjustable bearing element 166 on the inner shroud portion 102 rather than the outer shroud portion 104. This is one of many optional adjustments that can be made to the apparatus without deviating from the scope of the present invention. It is also possible to provide two or more adjustable bearing elements. Whilst one is the minimum required to allow the arrangement to remove or limit free play, additional adjustable bearing elements may allow a greater degree of flexibility of adjustment of the apparatus. Other possible adjustments will be known to those skilled in the art.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A steering column assembly comprising:
   a telescopic shroud having an outer shroud portion and an inner shroud portion, an end of the inner shroud portion extending into the outer shroud portion;
   a plate fixed to the inner shroud portion including a slot that extends axially along the inner shroud portion;
   a block that is releasably interlockable with the plate to prevent telescopic motion of the inner shroud portion relative to the outer shroud portion; and
   a clamp assembly operable between a clamped condition in which the outer shroud portion clamps around the inner shroud portion and an unclamped condition in which the outer shroud portion is unclamped from the inner shroud portion,
   wherein the steering column assembly further comprises four bearing surfaces arranged in two facing pairs, one bearing surface of each facing pair being associated with the inner shroud portion and the other bearing surface of each facing pair being associated with the outer shroud portion, at least one adjustable bearing element including a respective one of the bearing surfaces, the at least one adjustable bearing element being adjustable relative to one of the inner shroud portion or outer shroud portion for setting an amount of rotational free play between the inner shroud portion and outer shroud portion when the clamp assembly is in an unclamped condition.

2. The steering column assembly as claimed in claim 1, wherein each facing pair includes two diametrically-opposed bearing surfaces.

3. The steering column assembly as claimed in claim 1, wherein each facing pair is configured to have a low coefficient of friction.

4. The steering column assembly as claimed in claim 1, wherein the adjustable bearing element includes a first end and a second end, the first end forming one of the bearing surfaces.

5. The steering column assembly as claimed in claim 4, wherein the second end is operable for adjustment of the adjustable bearing element.

6. The steering column assembly as claimed in claim 1, wherein the adjustable bearing element is mounted at least partially within an aperture in the outer shroud portion.

7. The steering column assembly as claimed in claim 6, wherein the adjustable bearing element includes a screw thread which is engageable with a corresponding screw thread in the aperture.

8. The steering column assembly as claimed in claim 6, wherein the adjustable bearing element, within the aperture, is accessible for adjustment.

9. The steering column assembly as claimed in claim 1, wherein one bearing surface of each facing pair is associated with the outer shroud portion and the other bearing surface of each facing pair is associated with the inner shroud portion.

10. The steering column assembly as claimed in claim 1, wherein one of the bearing surfaces of the outer shroud portion is formed on a non-adjustable bearing element.

11. The steering column assembly as claimed in claim 10, wherein the non-adjustable bearing element is a pin.

12. The steering column assembly as claimed in claim 11, wherein the pin includes a pin head which forms one of the bearing surfaces of the outer shroud portion.

13. The steering column assembly as claimed in claim 1, wherein the plate includes two lateral faces which form respective bearing surfaces.

14. The steering column assembly as claimed in claim 1, wherein the steering column assembly includes a clamp bolt which is rotatable by way of a lever in order to move the block into and out of engagement with the plate.

15. A method of assembling a steering column assembly so as to set rotational free play, the steering column assembly comprising:

an inner shroud portion and an outer shroud portion, an end of the inner shroud portion extending into the outer shroud portion, a plate fixed to the inner shroud portion including a slot that extends axially along the inner shroud portion, a block that is releasably interlockable with the plate to prevent telescopic motion of the inner shroud portion relative to the outer shroud portion, four bearing surfaces arranged in two facing pairs, one bearing surface of each facing pair being associated with the inner shroud portion and the other bearing surface of each facing pair being associated with the outer shroud portion, and an adjustable bearing element including one of the bearing surfaces, the method comprising:

positioning the inner shroud portion within the outer shroud portion such that one of the facing pairs of the bearing surfaces are in contact;

adjusting the adjustable bearing element to ensure both facing pairs of the bearing surfaces are in contact; and prior to adjusting the adjustable bearing element, applying a ramped force to the outer shroud portion, a gradient of the ramped force being detected to determine a clearance reduction between the inner shroud portion and outer shroud portion.

16. The method as claimed in claim 15, further comprising fixing the adjustable bearing element in position.

* * * * *